(12) United States Patent
Smadi

(10) Patent No.: US 9,326,284 B2
(45) Date of Patent: *Apr. 26, 2016

(54) METHODS AND APPARATUS FOR PROVIDING COMMUNICATIONS WITH USE OF FIRST AND SECOND RF TRANSCEIVER MODULES

(71) Applicant: BlackBerry Limited, Waterloo (CA)

(72) Inventor: Mohammed Nawaf Smadi, Waterloo (CA)

(73) Assignee: BlackBerry Limited, Waterloo (CA)

( * ) Notice: Subject to any disclaimer, the term of this patent is extended or adjusted under 35 U.S.C. 154(b) by 338 days.

This patent is subject to a terminal disclaimer.

(21) Appl. No.: 13/889,719

(22) Filed: May 8, 2013

(65) Prior Publication Data
US 2013/0242960 A1    Sep. 19, 2013

Related U.S. Application Data

(63) Continuation of application No. 12/860,040, filed on Aug. 20, 2010, now Pat. No. 8,457,020.

(51) Int. Cl.
*H04J 3/00* (2006.01)
*H04B 7/212* (2006.01)
(Continued)

(52) U.S. Cl.
CPC .......... *H04W 72/0446* (2013.01); *H04W 28/26* (2013.01); *H04W 76/02* (2013.01); *H04W 84/12* (2013.01); *H04W 84/18* (2013.01); *H04W 88/06* (2013.01)

(58) Field of Classification Search
CPC . H04W 28/26; H04W 72/04; H04W 72/0446; H04W 74/04; H04W 76/02; H04W 84/12; H04W 84/18; H04W 88/04; H04W 88/06
USPC ......... 370/310–350, 435–437, 442, 464–465, 370/468, 477–478, 493–495, 498; 455/421–466
See application file for complete search history.

(56) References Cited

U.S. PATENT DOCUMENTS

7,725,118 B2 * 5/2010 Yang ..................... H04W 16/14
370/447
7,734,253 B2 * 6/2010 Chen et al. ................... 455/41.2
(Continued)

FOREIGN PATENT DOCUMENTS

EP    1860827 A2    12/2006
EP    1860833 A1    2/2007
(Continued)

OTHER PUBLICATIONS

Office Action dated Jun. 12, 2013 for corresponding Canadian Patent Application No. 2,747,021.
(Continued)

*Primary Examiner* — Tri H Phan
(74) *Attorney, Agent, or Firm* — Ridout & Maybee LLP

(57) ABSTRACT

A method of communicating using first and second radio frequency (RF) transceiver modules of a communication device involves reserving selected timeslots for a wireless communication link of a first RF transceiver module; communicating data via the second RF transceiver module during the selected reserved timeslots; and simultaneously communicating data via the first RF transceiver module during remaining unreserved timeslots of the wireless communication link.

22 Claims, 8 Drawing Sheets

(51) Int. Cl.
*H04W 72/04* (2009.01)
*H04W 28/26* (2009.01)
*H04W 76/02* (2009.01)
*H04W 84/12* (2009.01)
*H04W 84/18* (2009.01)
*H04W 88/06* (2009.01)

(56) References Cited

U.S. PATENT DOCUMENTS

| | | | |
|---|---|---|---|
| 7,873,385 | B2 | 1/2011 | Boireau et al. |
| 7,941,178 | B2 * | 5/2011 | Guo et al. ............ 455/552.1 |
| 8,107,880 | B2 | 1/2012 | Okker et al. |
| 8,155,695 | B2 * | 4/2012 | Wang et al. ............ 455/553.1 |
| 8,417,187 | B2 * | 4/2013 | Chen et al. ............ 455/63.1 |
| 8,442,434 | B2 * | 5/2013 | Grushkevich et al. ....... 455/41.2 |
| 8,547,867 | B2 * | 10/2013 | Koo ............ H04B 1/1027 370/252 |
| 8,626,067 | B2 * | 1/2014 | Ko ............ H04W 72/1215 455/41.2 |
| 8,675,544 | B1 * | 3/2014 | Hirsch ............ H04B 7/2656 370/322 |
| 8,792,832 | B2 * | 7/2014 | Chen et al. ............ 455/63.1 |
| 8,818,280 | B2 * | 8/2014 | Ko ............ H04W 72/1215 455/41.2 |
| 2003/0058830 | A1 | 3/2003 | Schmidt |
| 2003/0235179 | A1 | 12/2003 | Tuomela et al. |
| 2004/0120341 | A1 | 6/2004 | Hur et al. |
| 2005/0215197 | A1 | 9/2005 | Chen et al. |
| 2006/0239223 | A1 * | 10/2006 | Sherman ............ H04W 72/1215 370/329 |
| 2007/0147332 | A1 | 6/2007 | Lappetelainen et al. |
| 2008/0212649 | A1 | 9/2008 | Jougit |
| 2008/0247367 | A1 | 10/2008 | Guo et al. |
| 2009/0197639 | A1 * | 8/2009 | Khairmode ............ H04W 88/10 455/553.1 |
| 2010/0029325 | A1 | 2/2010 | Wang et al. |
| 2010/0080163 | A1 | 4/2010 | Krishnamoorthi et al. |
| 2010/0265856 | A1 * | 10/2010 | Yang ............ H04B 1/525 370/281 |
| 2010/0316025 | A1 | 12/2010 | Brandt et al. |
| 2012/0164948 | A1 * | 6/2012 | Narasimha ........ H04W 72/1215 455/63.1 |

FOREIGN PATENT DOCUMENTS

| | | |
|---|---|---|
| EP | 1928197 A2 | 6/2008 |
| WO | 2006/090254 | 8/2006 |
| WO | 2008070777 A2 | 6/2008 |
| WO | 2008117185 A2 | 10/2008 |

OTHER PUBLICATIONS

Office Action dated Sep. 12, 2013 for corresponding Canadian Patent Application No. 2,747,021.
European Search Report & Written Opinion for EP Patent Application No. 10173589.2 Nov. 19, 2010.
Kapoor et al., "Bluetooth: Carrying Voice Over ACL Links", Dec 10, 2002, pp. 1-5.
"Architecture—Data Transport", Bluetooth.com, Mar. 30, 2010, pp. 1-8. http://bluetooth.com/english/technology/works/pages/Data Transport Architecture,aspx.
Pang et al., "Channel Clustering and Probalistic Channel Visiting Techniques for WLAN Interference Mitigation in Bluetooth Device", IEEE Transactions on Electromagnetic Compatibility, Nov. 2007, pp. 914-923, vol. 49, Issue 4.
Mah-Rukh Fida, "Solutions to the WLAN & Bluetooth Interference", 5th International Conference on Information Technology, Apr. 7, 2009, pp. 1140-1141.

* cited by examiner

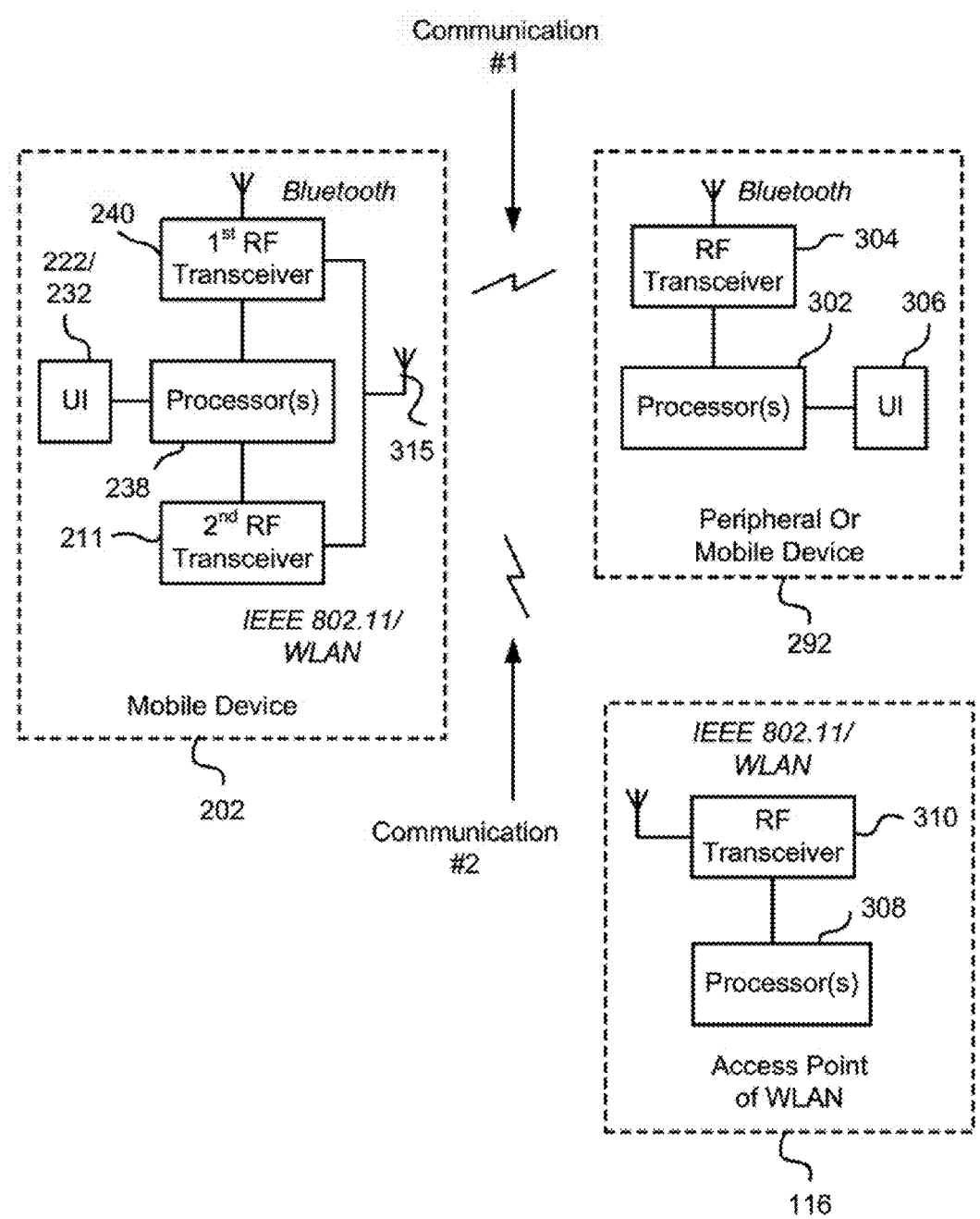

METHODS AND APPARATUS FOR PROVIDING COMMUNICATIONS WITH USE OF FIRST AND SECOND RF TRANSCEIVER MODULES

CROSS-REFERENCE TO RELATED APPLICATION

The present application is a continuation of and claims priority to U.S. non-provisional patent application having application Ser. No. 12/860,040 and filing date of 20 Aug. 2010, which is hereby incorporated by reference herein.

BACKGROUND

1. Field of the Technology

The present disclosure relates generally to radio communications, and more particularly to techniques for communicating data with use of first and second radio frequency (RF) transceiver modules of a mobile communication device.

2. Description of the Related Art

Mobile communication devices configured to operate in accordance with IEEE 802.11 standards or the like may communicate in wireless local area networks (WLANs). Such mobile devices may also include a co-located, low-power, radio operative in accordance with BLUETOOTH® standards. BLUETOOTH® is a registered trademark of Bluetooth SIG, Inc.

Interference resulting from inquiry or paging communication functions of the BLUETOOTH® radio for discovery may have a negative impact on WLAN communication functions, such as a voice telephony function. Other networks and environments may experience the same or similar problems.

What are needed are methods and apparatus to overcome these and other related deficiencies of the prior art.

BRIEF DESCRIPTION OF THE DRAWINGS

Embodiments of present invention will now be described by way of example with reference to attached figures, wherein:

FIG. 3A is an illustration of the various devices which may be employed in the technique for use in communicating data with use of first and second radio frequency (RF) transceiver modules;

DETAILED DESCRIPTION OF THE PREFERRED EMBODIMENTS

As described herein, a mobile communication device is operative to perform a first communication function (e.g. an inquiry or paging function for discovery) with use of a first radio frequency (RF) transceiver (e.g. BLUETOOTH transceiver), and a second communication function (e.g. voice telephony function) with use of a second RF transceiver (e.g. IEEE 802.11 transceiver). In response to identifying an indication to invoke the first communication function while the second communication function is being performed, the mobile device reserves selected timeslots of a wireless communication link with the first RF transceiver for establishing a synchronous link. The mobile device then causes data of the first communication function to be communicated, via the first RF transceiver, during remaining unreserved timeslots of the wireless communication link. The mobile device further causes data of the second communication function to be communicated, via the second RF transceiver, during the reserved timeslots of the synchronous link.

Figure 1:
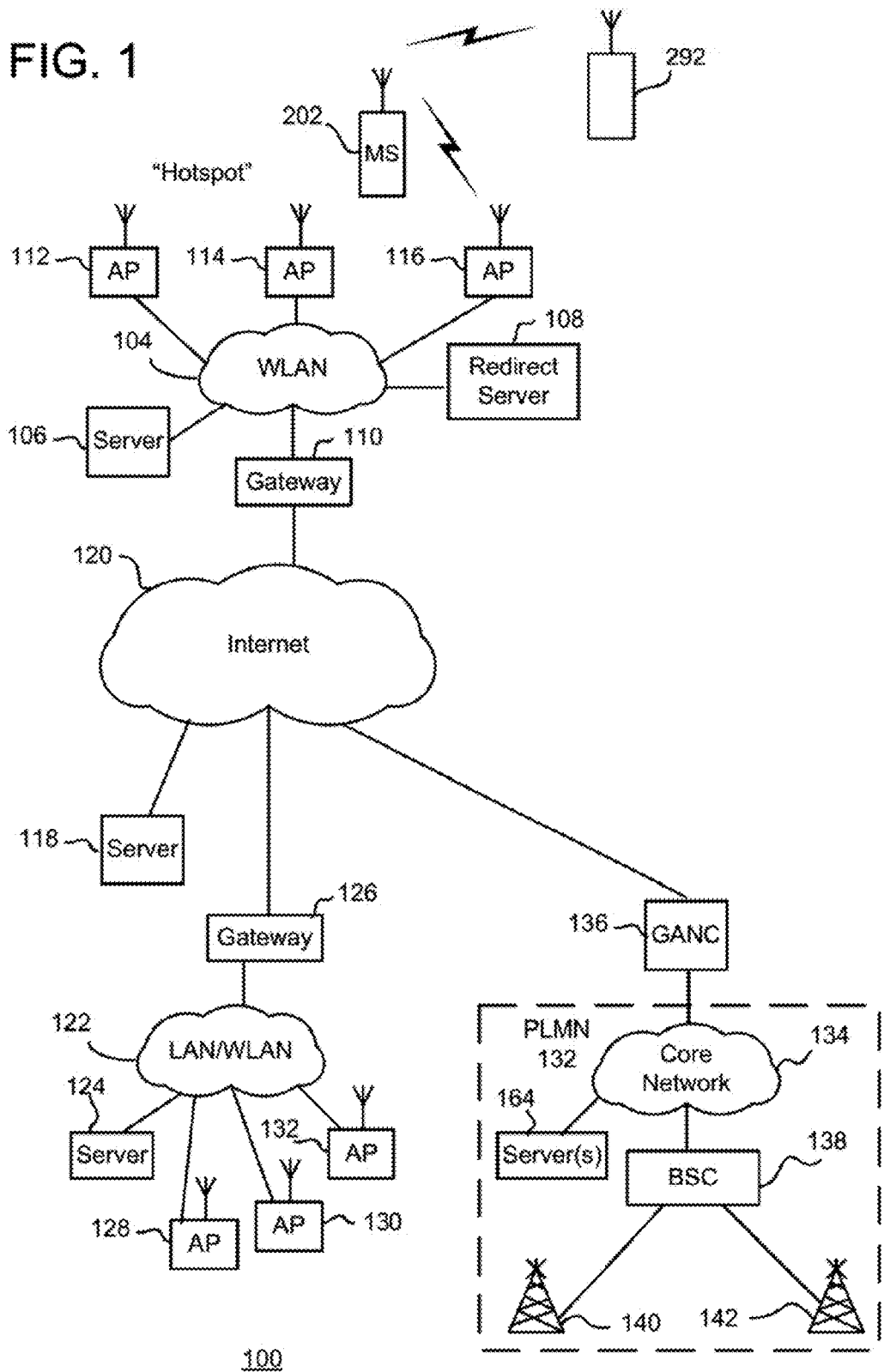
FIG. 1 is an illustrative representation of a communication system which includes a wireless communication network within which a communication device, such as a mobile communication device, may operate.

To illustrate one exemplary network architecture within which the techniques of the present disclosure may be practiced, FIG. 1 is a communication system 100 which includes a wireless local area network (WLAN) 104 within which a mobile communication device 202 may operate. WLAN 104 has a plurality of wireless access points (APs) 112, 114, and 116 for wireless communications with mobile device 202. In the present embodiment, WLAN 104 and mobile device 202 operate in accordance with IEEE 802.11 standards. Such WLANs are identifiable by a mobile device 202 from a Set Service Identifier (SSID) or Extended SSID (ESSID). WLAN 104 also includes one or more servers 106, a redirect server 108, and a gateway 110. Server 106 may provide data, applications, and/or functionality for communication services in WLAN 104.

Mobile device 202 may also operate for communications in different LANs/WLANs, such as WLAN 122. Similar to WLAN 104, WLAN 122 has a plurality of wireless APs 128, 130 and 132, one or more servers 124, and a gateway 126. In this embodiment, WLAN 122 is a private communication network of an enterprise (small company, corporation, etc.) associated with mobile device 202. Such WLANs 104 and 122 may provide or allow access to various data and communication services to its terminals. For example, the WLANs may provide for access to Internet 120 via the Web browser application, or voice telephony communication services with use of Voice over IP (VoIP) communications or other techniques.

For "push-type" data or message synchronization services, mobile device 202 is enabled to maintain data synchronization with a server (e.g. server 106 or 118) for user data of an application associated with a user account. The application of mobile device 202 and the server may be or include, for example, an electronic mail (e-mail) application program for the communication of e-mail messages. In this case, the data synchronization is a message synchronization for the e-mail messages associated with the user account for an e-mail application program. The data synchronization may alternatively or additionally be or include an address book synchronization for address book contacts in an address book organizer, or a calendar appointment synchronization for calendar appointments in a calendar application program. These and other applications of mobile device 202 are also identified later in relation to FIG. 5. For the data-synchronized communications, the server maintains storage of a mapping of a user account user name or identifier of the user account with a personal identification number of mobile device 202. When communications are required with mobile device 202, the personal identification number is used to route the messages to/from mobile device 202 through communication system 100.

In contrast to WLAN 122, WLAN 104 may be a public WiFi "hotspot" for public use and include what is referred to as a "captive portal" or "walled garden." For devices connected in WLAN 104 via one of wireless APs 112, 114, and 116, gateway 110 is configured to permit or deny access to the data, applications, and/or functionality, as well as to permit or deny external access outside of WLAN 104 to Internet 120. To do this, gateway 110 has a set of IP address filters which define a set of addresses that are permissible/impermissible, if any at all, for access by devices. Access by a device depends on whether or not a device has been authorized and what access rights are given upon authorization.

Typically, when a request by a device in WLAN 104 is made prior to proper authorization, gateway 110 is configured to redirect the request to redirect server 108. In response, redirect server 108 is configured to respond to mobile device 202 to provide data for producing information (e.g. a Web page information) which is rendered in a visual display of mobile device 202 via a Web browser application. The information may solicit a user response. For example, the information may solicit a user registration or login with user fields for entering a user name and/or password information. As another example, the information may solicit a user payment with user payment fields for entering in user payment information. Further, the information may solicit a user acceptance of terms of use, a license, or a legal disclaimer (options of "YES" or "NO", or "ACCEPT" or "DECLINE"). Redirect server 108 may be referred to by a different name depending on any more specific purpose (e.g. authentication server, registration server, user confirmation server, etc.).

The user will enter a user response via the Web browser application, for example, which is sent by mobile device 202 and received by gateway 110. Gateway 110 identifies whether the received user response is sufficient (e.g. whether the user name and password match prestored user name and password information, whether the user payment is accepted, whether the user acceptance is confirmed, etc.). If the user response is deemed sufficient, gateway 110 permits access to the data, applications, and/or functionality in or outside of WLAN 104.

Again, in contrast to WLAN 104, WLAN 122 may be a private communication network of an enterprise associated with mobile device 202. For devices attempting to access WLAN 122 via Internet 120, gateway 126 is configured to permit or deny internal access to the data, applications, and/or functionality in WLAN 122. For devices connected in WLAN 122 via one of wireless APs 128, 130, and 132, gateway 126 may be configured to permit or deny access to the data, applications, and/or functionality offered via WLAN 122 depending on whether or not a device has been authorized and what access rights are given upon authorization.

Communication may also be configured in accordance with Generic Access Network (GAN) technologies. Using GAN based technologies, mobile device 202 may also access communication services from a core network 134 of a Public Land Mobile Network (PLMN) 132 (e.g. cellular). GAN technology may provide, amongst other things, a voice communication service for mobile device 202 via the WLAN hotspot. PLMN 132 includes a core network 134, a plurality of base station controllers such as a base station controller (BSC) 138 coupled to core network 134, and a plurality of base stations such as a base station (BS) 140 and a base station 142 coupled to associated BSCs 138. Core network 134, BSC 138, and BS 140 operate in a conventional fashion as well-documented. Other PLMNs in the environment have a similar or the same architecture as PLMN 132. Such environments may be referred to as cellular telecommunications networks.

Communications between WLAN 104 and core network 134 of PLMN 132 may be facilitated through a suitable connecting network such as a broadband, wide-area IP communication network (e.g. the Internet 120) or any suitable public or private wide area network. Gateway/controller or GAN controller (GANC) 136 is provided between the Internet 120 and core network 134 of PLMN 132 in order to facilitate access to core network 134 by terminals through alternative links (e.g. radio links wireless APs 112, 114, and 116) different than those conventional radio links offered in the PLMN 132 (e.g. radio links of base stations 140 and 142). Thus, mobile device 202 may also access services of core network 134 of PLMN 132 via WLANs, such as WLAN 104, through use of a WLAN radio interface as opposed to a cellular telephony interface. For such communications, GANC 136 and mobile device 202 are adapted to establish and maintain a (secure) tunnel connection between each other through the intervening networks. Note that WLAN 104 may be operator-controlled or provided (e.g. controlled or provided by the operator associated with PLMN 132), user-controlled or provided (e.g. controlled or provided by the end user of mobile device 202), or third-party-controlled or provided.

Again, GANC 136 operates in accordance with GAN based technology (formerly known as Unlicensed Mobile Access (UMA), and may be or include GANC 136 (formerly known as UMA Network Controller or UNC) or the like. In this case, terminals including mobile device 202 are enabled with GAN technology for operating in a GAN mode of operation. GAN methodologies are known and described in publicly available documentation. Mobile device 202 with GAN-enabled, dual-mode operation may be within operating range of WLAN 104 for communications. Upon connecting, mobile device 202 contacts GANC 136, via WLAN 104 and the Internet 120, to be authenticated and authorized to access voice and data communication services of core network of PLMN 132. If approved, the subscriber's current location information is stored in core network 134 of PLMN 132 and, from that point on, all voice and data traffic for mobile device 202 is routed to the device via WLAN 104, in contrast to a radio access network (RAN) of PLMN 132 which includes BSC 138 and BSs 140 and 142. In this state, mobile device 202 is operating in a GAN mode of operation. When a call is established for mobile device 202 while operating within WLAN 104, the call connection for the call is routed within core network 134 but RF resources of WLAN 104 are utilized.

Today, mobile device 202 may be further configured to enter into an access point (AP) mode of operation, so that other communication devices (such as a mobile device 292 of FIG. 1) may associate with them for direct RF communications therebetween. This AP mode of operation, which may be referred to as a "Micro-AP mode", provides a benefit due to the high data rates available over WLAN links. For this purpose, the devices may operate in accordance with IEEE 802.11 CLPP (Configuration and Low Power Profile) and/or IEEE 802.11 AMP (Alternate MAC/PHY) standards. Here, again, the data may be communicated directly between the mobile devices 202 and 292 without the data traversing any wireless network infrastructure, where one of the mobile devices is set to operate or serve as an access point (AP) (switching operation from as an end terminal) and the other communication device operates as an end terminal to associate and connect with the AP (i.e. the mobile device operating as an AP) for communications. It is possible that when mobile device 202 operates in the AP mode, it may also operate as a client with another AP.

Figure 2:
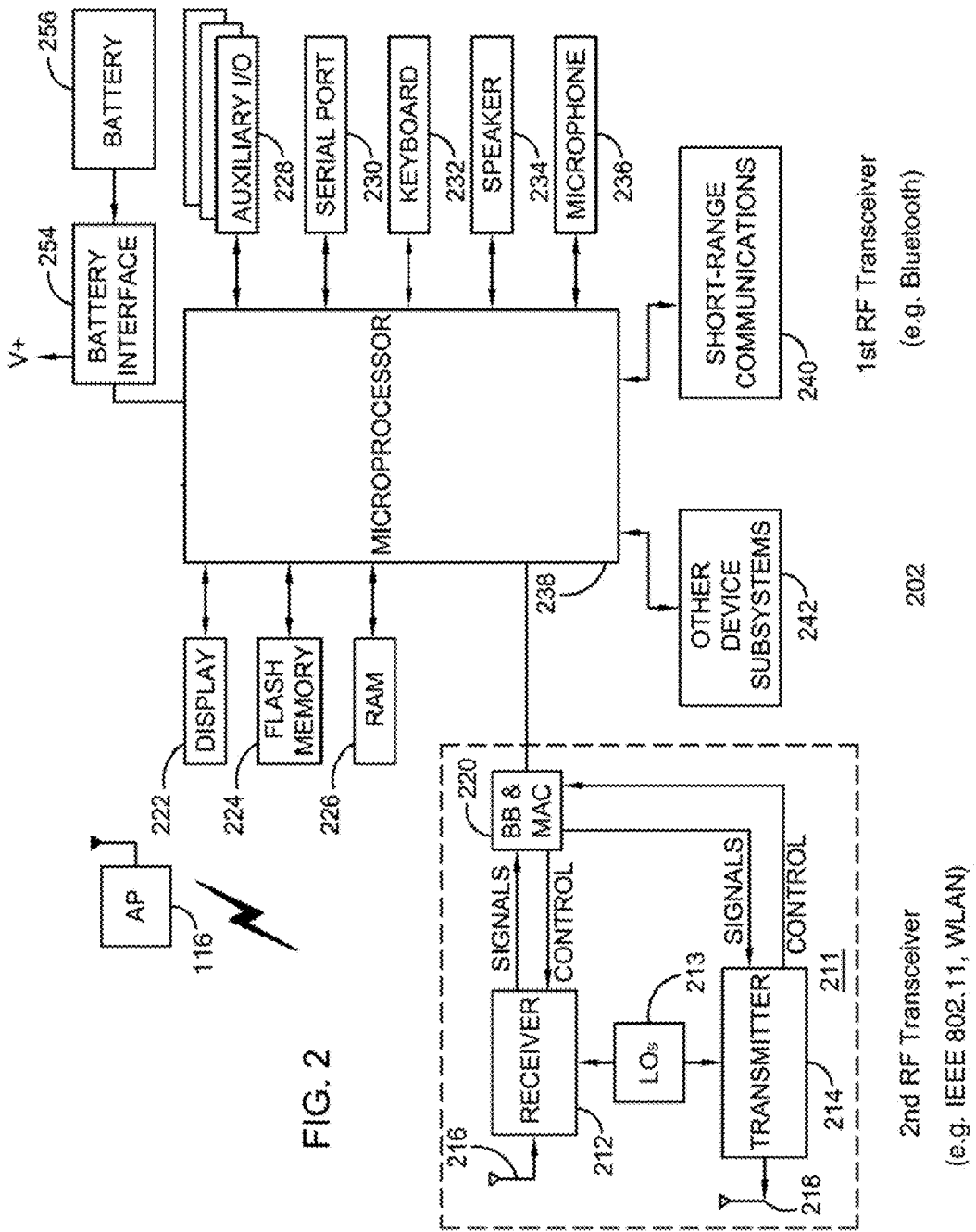
FIG. 2 is a schematic block diagram of a particular type of mobile communication device.

Referring now to FIG. 2, electrical components of a typical mobile communication device 202 (e.g. a mobile station, mobile terminal, or user equipment "UE", or the like) which operates with wireless APs of communication system 100 of FIG. 1 will be described. Mobile device 202 may be representative of one or more terminals shown and described in relation to FIG. 1. Mobile device 202 may be a two-way communication device having at least voice and/or advanced data communication capabilities, including the capability to communicate with other computer systems. Also, mobile device 202 may be a wireless communication device which operates in accordance with an IEEE 802.11 standards. Depending on the functionality provided by mobile device 202, it may be referred to as a data messaging device, a two-way pager, a cellular-type telephone with data messaging capabilities, a wireless Internet appliance, or a data communication device (with or without telephony capabilities).

As shown in FIG. 2, mobile device 202 is adapted to wirelessly communicate with wireless APs of WLANs, such as AP 116 of WLAN 104 of FIG. 1. For communication with AP 116, mobile device 202 utilizes a communication subsystem 211. Depending on the type of device, mobile device 202 may also be adapted to wirelessly communicate with other systems such as cellular telecommunication systems. With such configuration, mobile device 202 may be referred to as a "dual mode" mobile device. Although mobile device 202 may have separate and independent subsystems for these purposes, at least some portions or components of these otherwise different subsystems may be shared where possible.

Communication subsystem 211 includes a receiver 212, a transmitter 214, and associated components, such as one or more (e.g. embedded or internal) antenna elements 216 and 218, local oscillators (LOs) 213, and a processing module such as a baseband (BB) and media access control (MAC) processing module 220. Communication subsystem may be or referred to as a radio frequency (RF) transceiver or wireless transceiver. As will be apparent to those skilled in the field of communications, the particular design of communication subsystem 211 depends on the communication network in which mobile device 202 is intended to operate. In the present disclosure, communication subsystem 211 (including its associated processor/processing components) are operative in accordance with IEEE 802.11 standards.

Mobile device 202 may send and receive communication signals through the network after required network procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in BB/MAC processing module 220. In a similar manner, signals to be transmitted are processed, including modulation and encoding, for example, by BB/MAC processing module 220. These processed signals are input to transmitter 214 for digital-to-analog (D/A) conversion, frequency up conversion, filtering, amplification and transmission through the network via antenna 218. BB/MAC processing module 220 not only processes communication signals, but may also provide for receiver and transmitter control. Note that receiver 212 and transmitter 214 may share one or more antennas through an antenna switch (not shown in FIG. 2), instead of having two separate dedicated antennas 216 and 218 as shown.

Since mobile device 202 may be a handheld portable battery-powered device, it also includes a battery interface 254 for receiving one or more rechargeable batteries 256. Such a battery 256 provides electrical power to most if not all electrical circuitry in mobile device 202, and battery interface 254 provides for a mechanical and electrical connection for it. Battery interface 254 is coupled to a regulator (not shown in FIG. 2) that provides a regulated voltage to all of the circuitry.

Mobile device 202 includes a microprocessor 23 (one type of processor or controller) that controls overall operation of mobile device 202. This control includes the communication techniques of the present disclosure. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a (short-range) communication subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Keyboard 232 may be a complete alphanumeric keyboard and/or telephone-type keypad. On the other hand, keyboard 232 and display 222 may be replaced or enhanced with a touch screen display or other suitable input mechanism, or replaced or enhanced with a voice-activated input module.

Operating system software used by microprocessor 238 may be stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226. Microprocessor 238, in addition to its operating system functions, enables execution of software applications on mobile device 202. A predetermined set of applications that control basic device operations, including data and/or voice communication applications, will normally be installed on mobile device 202 during its manufacture. This includes applications or modules which are configured to perform the network selection techniques of the present disclosure. For this reason, microprocessor 238 (and any other processor(s) or modules of mobile device 202) may enable execution of particular applications or modules for performing enhanced network selection techniques for access to multiple aggregator services.

Another application that may be loaded onto mobile device 202 may be a personal information manager (PIM) application having the ability to organize and manage data items relating to user such as, but not limited to, e-mail, calendar events, voice mails, appointments, and task items. The PIM application has the ability to send and receive data items via the wireless network. In one embodiment, PIM data items are seamlessly integrated, synchronized, and updated via the wireless network, with the wireless device user's corresponding data items stored and/or associated with a host computer system thereby creating a mirrored host computer on mobile device 202 with respect to such items. This is especially advantageous where the host computer system is the wireless device user's office computer system. Additional applications may also be loaded onto mobile device 202 through network, an auxiliary I/O subsystem 228, serial port 230, (short-range) communication subsystem 240, or any other suitable subsystem 242, and installed by a user in RAM 226 or a non-volatile store (not shown) for execution by microprocessor 238. Such flexibility in application installation increases the functionality of mobile device 202 and may provide enhanced on-device functions, communication-related functions, or both. For example, secure communication applications may enable electronic commerce functions and other such financial transactions to be performed using mobile device 202.

In a data communication mode, a received signal such as a text message, an e-mail message, or web page download will be processed by communication subsystem 211 and input to microprocessor 238. Microprocessor 238 may further process the signal for output to display 222 or alternatively to auxiliary I/O device 228. A user of mobile device 202 may also compose data items, for example, using keyboard 232 in conjunction with display 222 and possibly auxiliary I/O device 228. In accordance with the present techniques, microprocessor 238 may process outgoing message requests and incoming responses described later in relation to FIGS. 3A-3B, whether or not such processing is part of the Web browser application. The composed items may be transmitted over a communication network through communication subsystem 211.

For voice communications, the overall operation of mobile device 202 is substantially similar, except that the received signals would be output to speaker 234 and signals for transmission would be generated by microphone 236. Alternative voice or audio I/O subsystems, such as a voice message recording subsystem, may also be implemented on mobile device 202. Although voice or audio signal output may be accomplished primarily through speaker 234, display 222 may also be used to provide an indication of the identity of a calling party, duration of a voice call or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile device 202 by providing for information or software downloads to mobile device 202 other than through a wireless communication network. The alternate download path may, for example, be used to load an encryption key onto mobile device 202 through a direct and thus reliable and trusted connection to thereby provide secure device communication.

Short-range communications subsystem 240 of FIG. 2 is an additional component that provides for communication between mobile device 202 and different systems or devices, which need not necessarily be similar devices. In this embodiment, communication subsystem 240 is a BLUETOOTH® communication module to provide for communication with similarly enabled systems and devices. Note that the BLUETOOTH® standards may be defined by or based on BLUETOOTH® Specification Version 2.0, Volumes 1 and 2, for example.

Note that, in the specific embodiment of the present disclosure, communication subsystem 240 may be deemed to be the first RF transceiver module operative in accordance with a first communication protocol, and communication subsystem 211 may be deemed to be the second RF transceiver module operative in accordance with a second communication protocol, operation which is described in more detail later in relation to FIG. 3A-3B and FIGS. 6-7.

Figure 4:
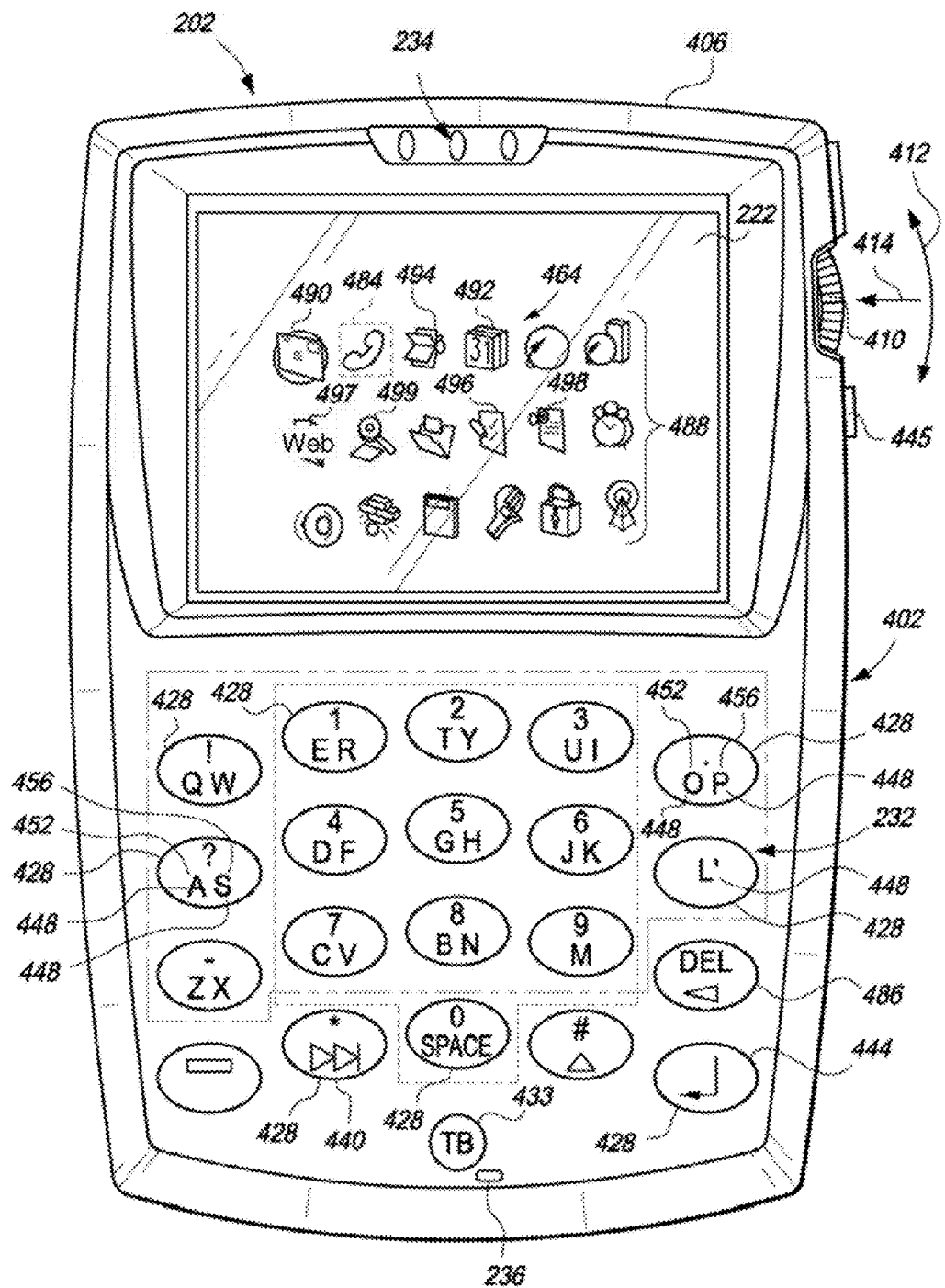
FIG. 4 is an illustrative example of an exemplary user interface of the mobile communication device of FIGS. 1, 2, and 3A-3B.

Referring ahead to FIG. 4, which is shown is an illustrative representation of an exemplary user interface 402 of a communication device (mobile device 202 of FIGS. 1 and 2). Mobile device 202 includes at least display 222, keyboard 232, speaker 234, microphone 236, and a cursor or view positioning mechanism such as a positioning wheel 410 (e.g. a scrollwheel) or a trackball 433. Although shown enlarged in FIG. 4 for clarity, this mobile communication device 202 is sized to be a handheld portable device. As an alternative to or in addition to positioning wheel 410 and/or trackball 433, a wide range of one or more pointing or cursor/view positioning mechanisms such as a touch pad, a joystick button, a mouse, a touchscreen, a tablet, or other whether presently known or unknown, may be employed. The cursor may be or include a pointer, a movable item or other visual cue used to mark a position or point to another item on a display, in order to, for example, indicate position for data entry or for selection of the other item.

Keys 428 of keyboard 232 are disposed on a front face of a housing 406 and positioning wheel 410 is disposed at a side of housing 406. Keyboard 232 is in the example form of a reduced QWERTY keyboard including a plurality of keys 428 that serve as input members. It can be seen that the arrangement of the characters 448 on keys 428 of keyboard 424 is generally of the QWERTY arrangement, albeit with many of keys 428 including two of characters 448. In the example depiction of keyboard 424, many of keys 428 include two characters, such as including a first character 452 and a second character 455 assigned thereto. Characters may include letters, digits, symbols and the like and can additionally include ideographic characters, components thereof, and the like. One of keys 428 of keyboard 424 includes as the characters 448 thereof the letters "Q" and "W", and an adjacent key 428 includes as the characters 448 thereof the letters "E" and "R". Keyboard 424 may be of other configurations, such as an AZERTY keyboard, a QWERTZ keyboard, a Dvorak keyboard, or other keyboard or keypad arrangement, and either reduced or not reduced (i.e. full). In a "full" or non-reduced keyboard or keypad arrangement, each key has a single letter (not multiple letters) of the alphabet assigned to it.

Among keys 428 of keyboard 232 are a <NEXT> key 440 and an <ENTER> key 444. The <NEXT> key 440, wherein, for example, "<NEXT>" may be a symbol or may be the word "next" provided (e.g. printed) on the key, may be pressed to provide a selection input to the processor and provides substantially the same selection input as is provided by a rotational input of positioning wheel 410. Since <NEXT> key 440 is provided adjacent a number of other keys 428 of keyboard 232, the user can provide a selection input to the processor substantially without moving the user's hands away from the keyboard 232 during a text entry operation. Another key, the <ESC> key 445 is disposed on the side of housing 406 adjacent positioning wheel 438, although the same or similar key may be disposed as part of keyboard 232. Among keys 428 of the keyboard 424 additionally is a <DEL> key 486 that can be provided to delete a text entry.

Positioning wheel 410 may serve as another input member and is both rotatable, as is indicated by an arrow 412, to provide selection inputs to the processor, and also can be pressed in a direction generally toward housing 406, as is indicated by an arrow 414 to provide another selection input to the processor.

Display 222 may include a cursor 484 that depicts generally where the next input or selection from user interface 402 will be received. Display 222 is shown in FIG. 4 as displaying a home screen that represents a number of applications 586 (FIG. 3 shows some of the example possible applications 86) depicted as corresponding discrete icons 488. Icons 488 include, for example, an Electronic Mail (E-Mail) icon 490, a Calendar icon 492, an Address Book icon 494, a Tasks icon 496, a Messages con 497, a MemoPad icon 498, and a Search icon 499, respectively.

Figure 5:
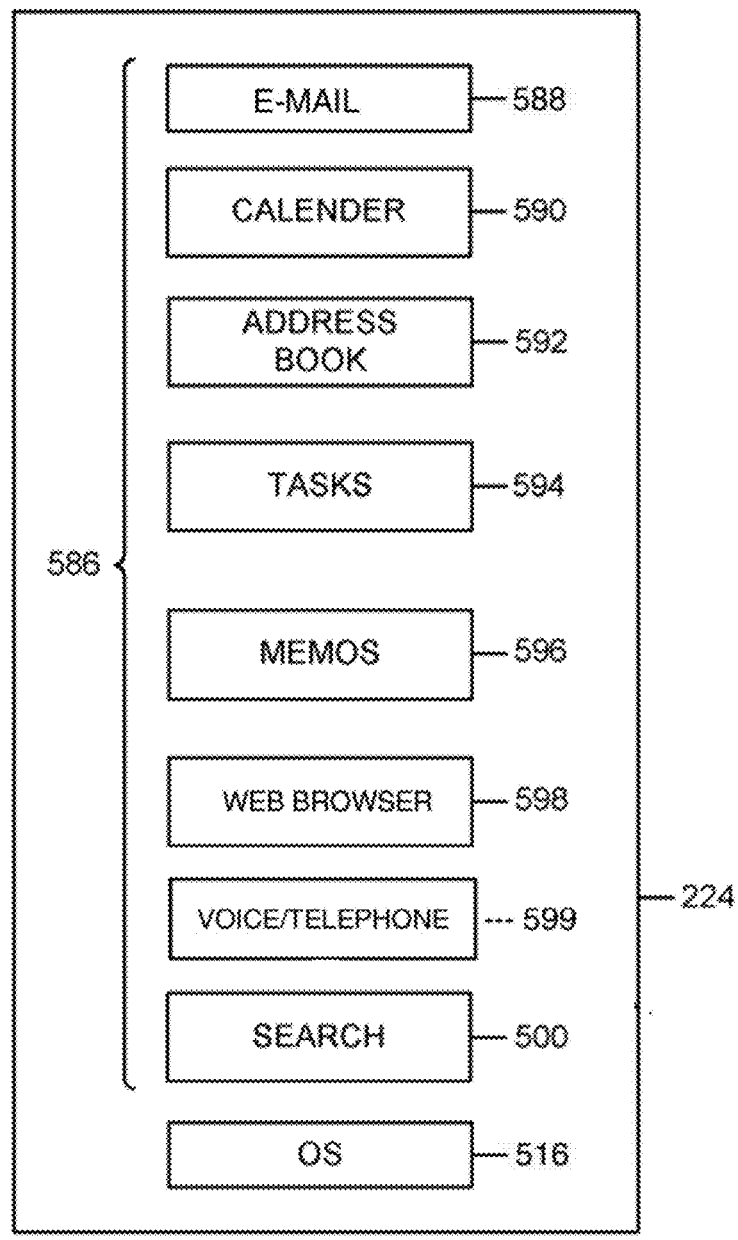
FIG. 5 is an illustrative representation of memory of the mobile communication device which includes a plurality of applications, many of which require some form of data communications.

As shown now further in FIG. 5, memory 224 of the mobile device includes a plurality of applications or routines 586 associated with the visually displayed icons 488 of FIG. 4 for the processing of data. Applications 586 may be in any of a variety of forms such as, without limitation, software, firmware, and the like. Applications 586 include, for example, an Electronic Mail (E-Mail) application 588 (FIG. 5) associated with E-mail icon 490 (FIG. 4), a Calendar application 590 (FIG. 5) associated with Calendar icon 492 (FIG. 4), an Address Book application 592 (FIG. 5) associated with Address Book icon 494 (FIG. 4), a Tasks application 594 (FIG. 5) associated with Tasks icon 496 (FIG. 4), a MemoPad (Memos) application 596 (FIG. 5) associated with MemoPad icon 498, a Web Browser application 598 (FIG. 5) associated with Web Browser icon 497 (FIG. 4), a Voice/Telephone application 599 (FIG. 5) associated with Voice/Telephone icon 484, and a Search application 500 (FIG. 5) associated with Search icon 499 (FIG. 4). An operating system (OS) program 516 also resides in memory 224.

The "home" screen output is shown in FIG. 4 as currently active and constitutes the main "ribbon" application for displaying the icons 488 shown. An application, such as E-mail application 588 of FIG. 5, may then be initiated (opened or viewed) from user interface 402 by providing a suitable user input to it. For example, E-mail application 588 may be initiated (opened or viewed) by rotating positioning wheel 410 to highlight E-mail icon 490 and providing a selection input by translating positioning wheel 410 in the direction indicated by arrow 438. As another example, display 222 displays icon 499 associated with Search application 500 and accepts input from positioning wheel 410 to initiate a search from that icon 499. Applications 586 may be additionally or alternatively initiated (opened or viewed) from user interface 402 by providing another suitable input to it, such as by suitably rotating or "rolling" trackball 433 and providing a selection input by, for example, pushing the trackball 433 (e.g. somewhat similar to positioning wheel 410 except into the plane of FIG. 4).

Movement, navigation, and/or scrolling with use of a cursor/view positioning mechanism is beneficial given the relatively large size of visually displayed information and the compact size of display 222 of FIG. 4, and since information and messages are typically only partially presented in the limited view of display 222 at any given moment. As previously described, positioning wheel 410 is one helpful cursor/view positioning mechanism to achieve such movement. Positioning wheel 410, which may be referred to as a scroll-wheel, specifically includes a circular disc which is rotatable about a fixed axis of housing 302 and may be rotated by the end user's index finger or thumb. When the information or message is being partially displayed, an upwards rotation of positioning wheel 410 causes an upwards scrolling such that display 222 presents viewing of an upper portion of the information or message. Similarly, a downwards rotation of positioning wheel 410 causes a downwards scrolling such that display 222 presents viewing of a lower portion of the information or message. Positioning wheel 410 is mounted along a fixed linear axis such that the end user can depress positioning wheel 410 inwards toward housing 406 (e.g. with the end user's index finger or thumb) for selection of information. Again, see the direction indicated by an arrow 414 of positioning wheel 410 shown.

Although a specific mobile device 202 has just been described, any suitable mobile communication device or terminal may be part of the inventive methods and apparatus which will be described in fuller detail below. Note that many components of mobile device 202 shown and described may not be included (e.g. a full QWERTY keypad may be optional). Again, keyboard 232 and display 222 may be substituted or enhanced with a touch screen display or other suitable input mechanism, or enhanced or replaced with a voice-activated input module. Also, although the description of the architecture relates to a specific example for illustration, where the WLAN is an IEEE 802.11-based network, different environments may be applicable as well. The wireless network may be a WiMAX-based network (i.e. IEEE 802.16), or an Ultra-WideBand (UWB)-based network (i.e. IEEE 802.15), as a few examples.

Referring back now to FIG. 3A, a depiction of the various devices which may be employed in the technique for use in communicating data in accordance with the present disclosure is shown. The devices in FIG. 3A include mobile device 202, a communication device 292, and access point (AP) 116 of the #LAN 104 (FIG. 1).

As is generalized in FIG. 3A, mobile device 202 includes one or more processors 238 (e.g. microprocessor 238 of FIG. 2), a user interface 222/232 (e.g. display/keyboard 222/232 of FIG. 2) coupled to the one or more processors 238, a first RF transceiver module 240 (e.g. communication subsystem 240 of FIG. 2), and a second RF transceiver module 211 (e.g. communication subsystem 211 of FIG. 2). An antenna 315 may be shared with and coupled to first and second RF transceiver modules 240 and 211. As shown, first and second RF transceivers modules 240 and 211 are collocated in mobile device 202 with the one or more processors 238 (e.g. within the same housing unit of mobile device 202).

First RF transceiver module 240 operates in accordance with a first communication protocol standard, and second RF transceiver module 211 operates in accordance with a second communication protocol standard different from the first communication protocol standard. In the embodiment described, the first communication protocol of first RF transceiver module 240 is a BLUETOOTH® communication protocol, and the second communication protocol of second RF transceiver module 211 is an IEEE 802.11 communication protocol.

In addition, first RF transceiver module 240 operates to communicate data over one or more first RF channels of a first RF band and second RF transceiver module 211 operates to communicate data over one or more second RF channels of a second RF band that overlaps with the first RF band. Alternatively, first RF transceiver module 240 may operate to communicate data over one or more first RF channels of a first RF band and second RF transceiver module 211 may operate to communicate data over one or more second RF channels of a second RF band with little or no overlap with the first RF band, but cross-channel interference between the first and the second RF bands is possible or realizable.

In the present embodiment, the relevant RF band may be the 2.4 GigaHertz (GHz) band. The first communication protocol, which may be the BLUETOOTH® communication protocol, employs adaptive frequency hopping (AFH) using a plurality of RF channels. In BLUETOOTH®, there are eighty (80) RF channels, where each RF channel has a bandwidth of one (1) MegaHertz (MHz). On the other hand, the second communication protocol, which may be an IEEE 802.11 communication protocol, utilizes a different plurality of RF channels in the same RF band. In IEEE 802.11, there are fourteen (14) fixed RF channels, where each RF channel has a bandwidth of twenty-two (22) MHz. Each IEEE 802.11 channel overlaps with exactly specific BLUETOOTH® channels. In other environments or embodiments, a different number of RF channels may be overlapping.

Communication device 292 may include one or more processors 302, a user interface 306 coupled to the one or more processors 302, and an RF transceiver module 304 coupled to one or more processors 302. RF transceiver module 304 may be operative in accordance with the first communication protocol (e.g. BLUETOOTH® communication protocol).

In the embodiment described, communication device 292 may be a wireless peripheral device, such as an audio headset or earpiece, or other suitable peripheral, for use with mobile device 202. As such, communication device 292 may provide an additional (wireless) user interface for mobile device 202. User interface 306 of communication device 292 may include one or more user input keys, a speaker (or earpiece), and/or a microphone (not shown in FIG. 3A).

Communication device 292 may be utilized as the peripheral/user interface when wireless communications is established between mobile device 202 and communication device 292. In particular, data (such as voice data) may be communicated between the devices 292 and 202 in accordance with the first communication protocol between first RF transceiver module 240 of mobile device 202 and RF transceiver module 304 of communication device 292.

In an alternative embodiment, communication device 292 may be a mobile communication device (or an end terminal) which is similar in make, construction, and operation as mobile device 202. In such case, communication device 292 may further include an additional RF transceiver module (not shown in FIG. 3A) which may be operative in accordance with the second communication protocol (e.g. the IEEE 802.11 communication protocol). If communication device 292 includes the additional RF transceiver module operative in accordance with the second communication protocol, and may also be set to operate in accordance with an "AP mode" of operation, then data may also be communicated directly between second RF transceiver module 211 of mobile device 202 and the additional RF transceiver module of communication device 292. For example, communication device 292 may further operate in accordance with IEEE 802.11 CLPP (Configuration and Low Power Profile) and/or IEEE 802.11 AMP (Alternate MAC/PHY) standards to provide this feature. In such case, data may be communicated directly between devices 202 and 292 without the data traversing any wireless network infrastructure in accordance with the second communication protocol, where communication device 292 is set to operate or serve as an AP (i.e. switching operation from an end terminal) and mobile device 202 operates as an end terminal to associate and connect with communication device 292 for communications.

AP 116 of the WLAN includes one or more processors 308 and an RF transceiver module 310 operative in accordance with the second communication protocol (e.g. the IEEE 802.11 communication protocol). Data may be communicated between mobile device 202 and AP 116 in accordance with the second communication protocol between second RF transceiver module 240 of mobile device 202 and RF transceiver module 310 of AP 116.

As shown, communication using first RF transceiver module 240 of mobile device 202 is indicated in FIG. 3A as "Communication #1". Such communication may be part of an inquiry or paging function of mobile device 202 for discovery, either function of which may be performed with use of first RF transceiver module 240 in accordance with the first communication protocol. On the other hand, communication using second RF transceiver module 202 of mobile device 202 is indicated in FIG. 3A as "Communication #2". Such communication of mobile device 202 may be part of a voice telephony function (VoIP call) or other user data communication function of mobile device 202, which may be performed with use of second RF transceiver module 211 in accordance with the second communication protocol.

Figure 3B:
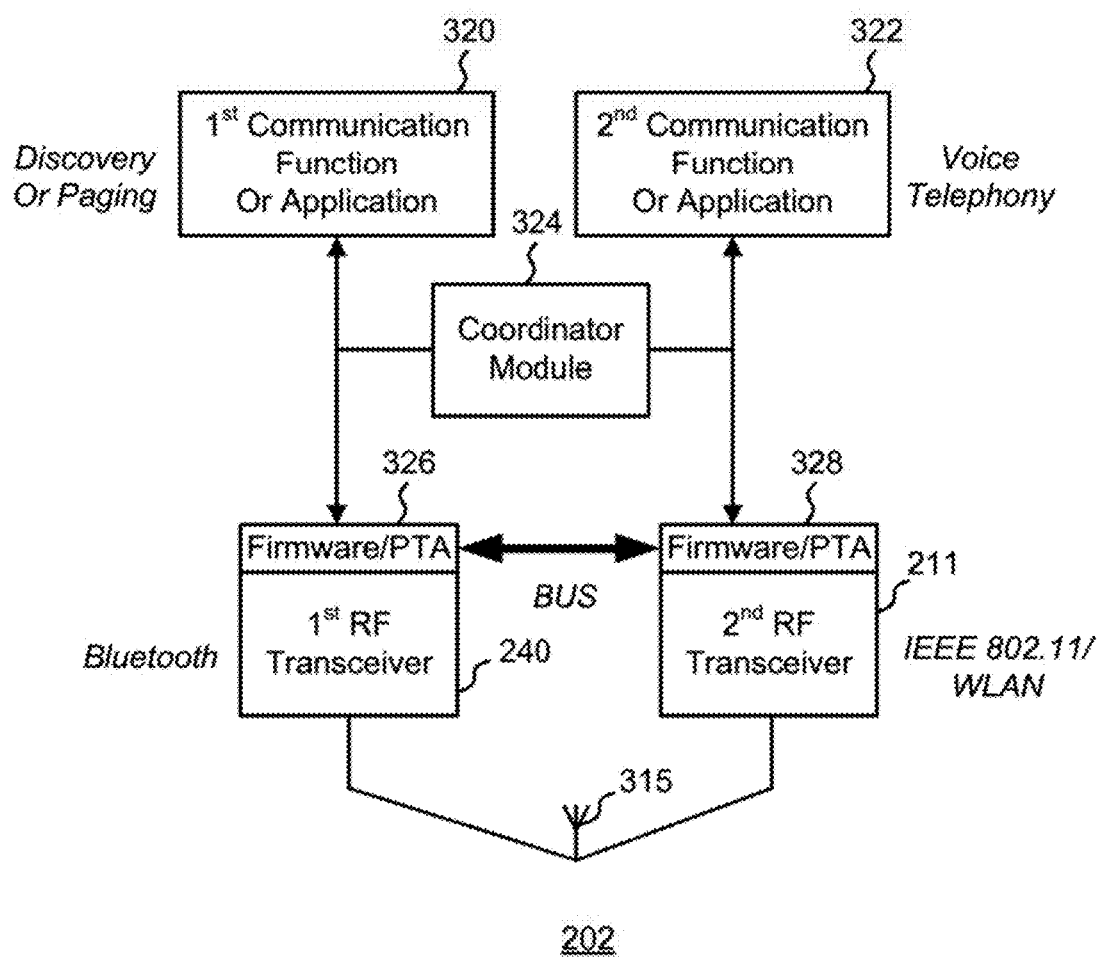
FIG. 3B is an illustration of the general components or modules of the mobile communication device which may be employed in the technique for use in communicating the data with use of the first and the second RF transceiver modules.

FIG. 3B is an illustration of the general components or modules of the mobile device 202 which may be employed in the method for use in communicating data in accordance with the present disclosure. Mobile device 202 is shown to include a first communication function or application 320, a second communication function or application 322, and a coordinator module 324 operative to coordinate communications of first and second RF transceiver modules 240 and 211. As described earlier, first communication function 320 of mobile device 202 may be an inquiry or paging function for discovery, or any other suitable function which makes use of first RF transceiver module 240. Second communication function 322 of mobile device 202 may be a voice telephony function (e.g. VoIP call), other user data communication function, or any other suitable function which makes use of second RF transceiver module 211.

First and second RF transceiver modules 240 and 211 include firmware modules 326 and 328, respectively, to instruct appropriate operation. Firmware modules 326 and 328 include packet traffic arbitration (PTA) modules to control and arbitrate use of the RF band for communications using first and second RF transceiver modules 240 and 211. First and second RF transceiver modules 240 and 211 may be provided different integrated circuit (IC) devices or chips, where a bus (i.e. a three-wire bus) is provided for communications therebetween. In an alternative embodiment, first and second RF transceiver modules 240 and 211 are provided on the same IC device or chip.

Figure 6:
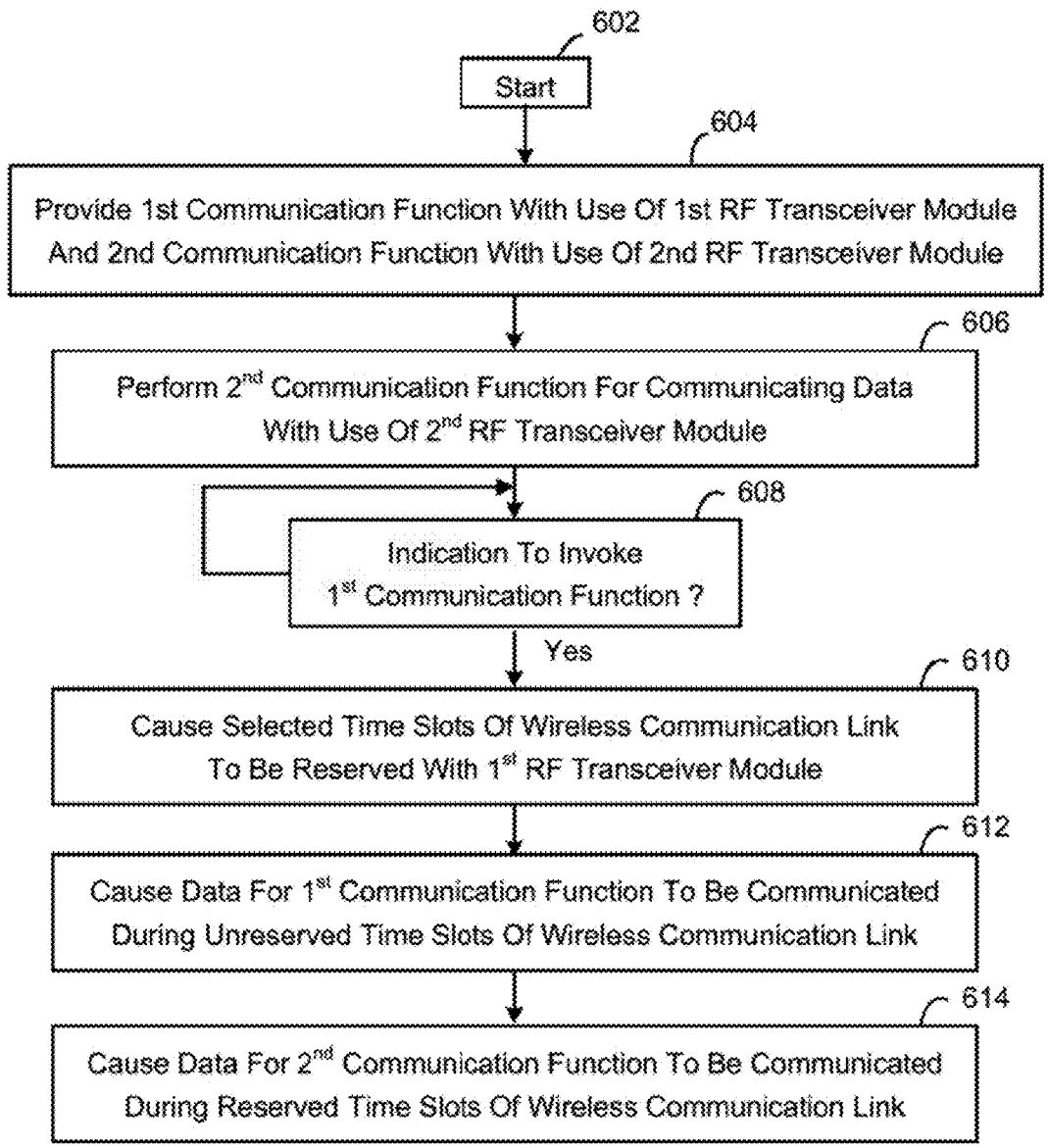
FIG. 6 is a flowchart of a method for use in communicating data with use of the first and second RF transceiver modules of the mobile communication device.

Referring ahead now to FIG. 6, a flowchart of an illustrative method for use in communicating data with use of first and second RF transceiver modules of a communication device. The communication device which employs the method is generally configured to operate as an end terminal in a wireless communication network. Specifically, the method of FIG. 6 may be performed by mobile device 202 described in relation to FIGS. 1-5, and utilize the components and devices as described. In general, the techniques described in relation to the flowchart of FIG. 6 may be performed by one or more controllers or processors of the communication device with use of its first and second RF transceiver modules. A computer program product which may embody the technique may include a computer readable medium (e.g. memory of the communication device, computer disk, CD-ROM, etc.) having computer instructions stored therein which are executable by the one or more processors of the communication device for performing the technique. Specific actions for advantageous operation per the present disclosure, for reservation and use of the timeslots of the wireless communication link, may be performed in and by coordinator module 324 of FIG. 3B.

Beginning at a start block 602 of FIG. 6, the communication device is configured to provide a first communication function which makes use of the first RF transceiver module and the second communication function which makes use of a second RF transceiver module (step 604 of FIG. 6A). The first communication function may be an inquiry or paging function for discovery, or any other suitable function which makes use of the first RF transceiver module, whereas the second communication function may be a voice telephony function, other user data communication function, or any other suitable function which makes use of the second RF transceiver module.

The first RF transceiver module operates in accordance with a first communication protocol and the second RF transceiver module operates in accordance with a second communication protocol that is different from the first communication protocol. The first and second communication protocols are defined from and in different communication standards. Also, the first RF transceiver module operates for communication over one or more first RF channels of a first RF band, and the second RF transceiver module operates for communication over one or more second RF channels of a second RF band that overlaps with the first RF band.

The communication device operates to perform the second communication function for communicating data with use of the second RF transceiver module (step 606 of FIG. 6). In the illustrative example, the second communication function is the voice telephony function, where the communication device operates in a two-way voice call using VoIP communications via the AP of the WLAN. For example, see "Communication #2" in FIG. 3A.

The communication device further operates to regularly monitor for an indication for requesting or invoking the first communication function (step 608 of FIG. 6). In the illustrative technique, the first communication function is an inquiry or paging function for discovery for identifying available devices for communications within a surrounding area of the communication device. Note however that, if the first communication function is invoked while the second communication function is being performed, communications may be undesirably disrupted unless particular actions are taken to prevent such disruption.

In the present technique, in response to identifying the indication for invoking the first communication function in step 608 while the second communication function is being performed, the communication device operates to reserve selected timeslots of a wireless communication link with the first RF transceiver module (step 610 of FIG. 6). The reservation of timeslots with the first RF transceiver module is made in accordance with the first communication protocol. Reserving the selected timeslots of the wireless communication link causes the first. RF transceiver module to prohibit the communication of the data during such selected timeslots. The reserved timeslots of the wireless communication link will not be utilized for the communication of data of the first communication function via the first RF transceiver module, but rather be kept "clear" so that the second RF transceiver module may (continue to) communicate data of the second communication function without disruption.

The communication device then causes the data for the first communication function to be communicated via the first RF transceiver module during remaining, unreserved timeslots of the wireless communication link (step 612 of FIG. 6), per the request. See e.g. "Communication #1" in FIG. 3A. Further, the communication device causes the data of the second communication function to be communicated via the second RF transceiver module during the reserved timeslots (step 614 of FIG. 6). See again e.g. "Communication "2" in FIG. 3A.

Thus, communication of data in steps 612 and 614 of FIG. 6 may be performed contemporaneously in a time-interleaved manner, with little or no communication disruption between the first and the second RF transceiver modules.

In step 610, any suitable number of timeslots of the wireless communication link may be reserved, such as one (1), two (2), or three (3) timeslots. In one embodiment, the number of timeslots to be reserved with the first RF transceiver module is selected in accordance with the bandwidth and/or quality of service (QoS) required for communications for the second communication function using the second RF transceiver module, or in accordance with both the bandwidth/QoS required for communications of the first and the second communication functions.

During the communication of the data of the first and the second communication functions, if the second communication function requires more or less bandwidth or QoS, more or less bandwidth or QoS may be provided by updating the reservation period (i.e. updating the number of selected timeslots of the reservation).

In the technique, coordinator module 324 of FIG. 3B is the entity that is operative to coordinate communications of first and second RF transceiver modules 240 and 211, to issue/withdraw timeslot reservation(s) to first RF transceiver module 240 in response to the appropriate indications or signal. On the other hand, the PTAs of firmware modules 326 and 328 operate to arbitrate access to the medium. For example, the PTA of second RF transceiver module 211 may operate to indicate when second RF transceiver module 211 is permitted to and/or denied from performing communication operations per the slot reservations of first RF transceiver module 240, which may be based on timing information received from firmware module 326 of first RF transceiver module 240 or from coordinator module 324.

In one embodiment, the reservation of selected timeslots in step 610 is part of establishing a synchronous connection-oriented (SCO) link with the first RF transceiver module per the first communication protocol. Communications of first RF transceiver module during the remaining unreserved timeslots. Note that the SCO link may ordinarily be utilized to carry data (such as voice data) via the first RF transceiver module per the first communication protocol. In the present technique of FIG. 6, however, selected timeslots are reserved but no SCO steam is actually being communicated via the first RF transceiver module over the reserved SCO link. Instead, data are being communicated via the second RF transceiver module during the reserved timeslots of the reserved SCO link. The number of SCO timeslots to be reserved may be selected in accordance with the bandwidth and/or QoS required for communications for the second RF transceiver module, or in accordance with both the bandwidth/QoS required for communications for the first and the second RF transceiver modules.

In the embodiment using such reserved SCO link, in response to identifying the indication to invoke the first communication function in step 608, coordinator module 324 of FIG. 3B operates to send a "reserve" command to first RF transceiver module 240 over a host controller interface (HCI) for the reservation of the selected timeslots in step 610. However, coordinator module 324 operates to refrain from sending any "start SCO" command to first RF transceiver module 240 over the HCI which would ordinarily be issued to actually establish the SCO link. Again, there is no SCO stream actually being communicated over the SCO link via first RF transceiver module 240.

Figure 7:
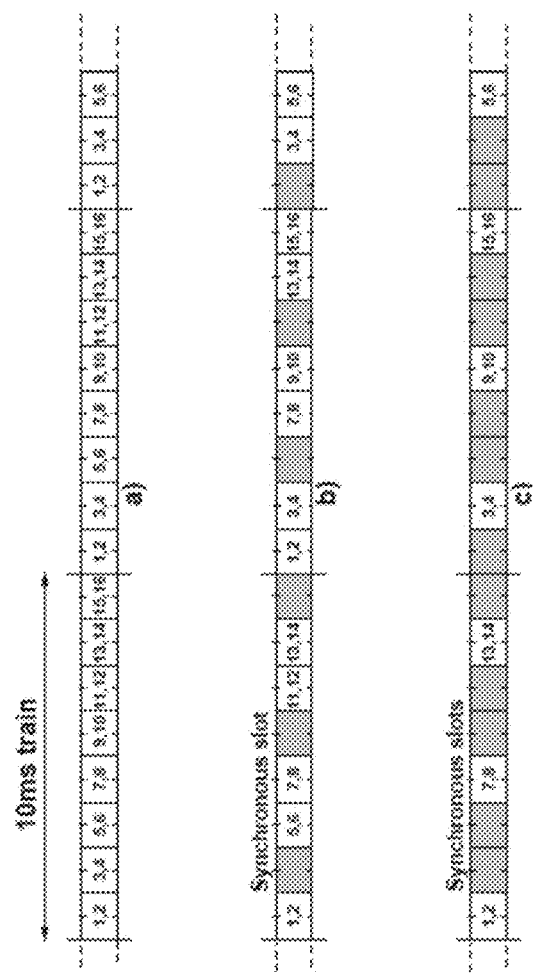
FIGS. 7(a), 7(b), and 7(c) are graphs of timing diagrams which illustrate the reservation of timeslots on the wireless communication link with the first RF transceiver module for communicating data via the second RF transceiver module.

FIGS. 7(*a*), 7(*b*), and 7(*c*) are graphs of timing diagrams which illustrate how timeslots may be reserved on the wireless communication link with the first RF transceiver module. In FIG. 7(*a*), the mobile device operates the first RF transceiver module to perform an inquiry or page function for discovery; no timeslots are reserved for any SCO link. The mobile device may send two requests on two different frequencies during slot 1, where it expects that a discoverable device will be listening. If the discoverable device happens to be listening on one of those frequencies, then it will respond in slot 2. If no response is received in slot 2, then the mobile device sends two other requests in slot 3, and the sequence repeats.

In FIG. 7(*b*), the mobile device operates to reserve selected timeslots for a single SCO link, which in this case utilizes one-third of the medium. Since the mobile device operates to refrain from interrupting the (supposed) SCO stream on the SCO link, the mobile device refrains from sending (and receiving) data for the inquiry or page function for one-third of the time during these reserved slots. Instead, the mobile device communicates the data during the remaining unreserved slots. In FIG. 7(*c*), the mobile device operates to reserve selected timeslots for two SCO links, which utilizes two-thirds of the medium. Since the mobile device operates to refrain from interrupting the (supposed) SCO streams, the mobile device refrains from sending (and receiving) data for the inquiry or page function for two-thirds of the time during these reserved slots. Again, the mobile device instead communicates the data during the remaining unreserved timeslots.

Thus, as described herein, a mobile communication device is operative to perform a first communication function (e.g. inquiry or paging function for discovery) with use of a first radio frequency (RF) transceiver (e.g. BLUETOOTH transceiver), and a second communication function (e.g. voice telephony function) with use of a second RF transceiver (e.g. IEEE 802.11 transceiver). In response to identifying an indication to invoke the first communication function while the second communication function is being performed, the mobile device reserves selected timeslots of a wireless communication link with the first RF transceiver for establishing a synchronous link. The mobile device then causes data of the first communication function to be communicated, via the first RF transceiver, during remaining unreserved timeslots of the wireless communication link. The mobile device further causes data of the second communication function to be communicated, via the second RF transceiver, during the reserved timeslots of the synchronous link.

The above-described embodiments of the present disclosure are intended to be examples only. Those of skill in the art may affect alterations, modifications and variations to the particular embodiments without departing from the scope of the application. In other environments, for example, the data of the first communication function may be communicated during the reserved timeslots and the data of the second communication function may be communicated during the unreserved timeslots. The invention described herein in the recited claims intends to cover and embrace all suitable changes in technology.

What is claimed is:

1. A method of communicating using first and second radio frequency (RF) transceiver modules of a communication device, the method comprising:
reserving selected timeslots for a wireless communication link of a first RF transceiver module;
communicating data via the second RF transceiver module during the selected reserved timeslots;
communicating data via the first RF transceiver module during remaining unreserved timeslots of the wireless communication link for a voice telephony function of the communication device;
refraining from causing data to be communicated via the first RF transceiver module during the reserved timeslots of the wireless communication link; and
refraining from causing data to be communicated via the second RF transceiver module during the remaining unreserved timeslots.

2. The method of claim 1, wherein the wireless communication link further includes a synchronous link for the selected reserved timeslots.

3. The method of claim 1, wherein communicating data via the second RF transceiver module during the selected reserved timeslots is performed for a first communication function of the communication device.

4. The method of claim 1, wherein communicating data via the first RF transceiver module during the remaining unreserved timeslots is performed for a second communication function of the communication device.

5. The method of claim 1, wherein communicating data via the second RF transceiver module during the selected reserved timeslots is performed for an inquiry or paging function for discovery of the communication device.

6. The method of claim 1, wherein communicating the data via the first RF transceiver is performed in accordance with a BLUETOOTH standard.

7. The method of claim 1, wherein communicating the data via the second RF transceiver is performed in accordance with an IEEE 802.11 standard.

8. The method of claim 1, wherein the first RF transceiver module is operative in accordance with a first communication protocol standard and the second RF transceiver module is operative in accordance with a second communication protocol standard.

9. The method of claim 1, which is embodied as computer instructions stored in memory of the mobile communication device.

10. The method of claim 1, wherein the selected reserved timeslots comprise about one-third of timeslots of the wireless communication link.

11. The method of claim 1, further comprising reserving further selected timeslots of the wireless communication link for a further synchronous link.

12. A communication device, comprising:
a first radio frequency (RF) transceiver module;
a second RF transceiver module;
one or more processors coupled to the first and the second RF transceiver modules;
the one or more processors being configured to:
reserve selected timeslots for a wireless communication link of the first RF transceiver module;
communicate data via the second RF transceiver module during the selected reserved timeslots;
communicate data via the first RF transceiver module during remaining unreserved timeslots of the wireless communication link for a voice telephony function of the communication device,
refrain from causing data to be communicated via the first RF transceiver module during the reserved timeslots of the wireless communication link; and
refrain from causing data to be communicated via the second RF transceiver module during the remaining unreserved timeslots.

13. The communication device of claim 12, wherein the wireless communication link further comprises a synchronous link for the selected reserved timeslots.

14. The communication device of claim 12, wherein the one or more processors are further configured to communicate the data via the second RF transceiver module during the selected reserved timeslots is performed for a first communication function of the communication device.

15. The communication device of claim 12, wherein the one or more processors are further configured to communicate data via the first RF transceiver module during the remaining unreserved timeslots for performing a second communication function of the communication device.

16. The communication device of claim 12, wherein the one or more processors are further configured to communicate data via the second RF transceiver module during the selected reserved timeslots for performing an inquiry or paging function for discovery of the communication device.

17. The communication device of claim 12, wherein the first RF transceiver module operates to communicate the data in accordance with a BLUETOOTH standard.

18. The communication device of claim 12, wherein the second RF transceiver module operates to communicate the data in accordance with an IEEE 802.11 standard.

19. The communication device of claim 12, wherein the first RF transceiver module is operative in accordance with a first communication protocol standard and the second RF transceiver module is operative in accordance with a second communication protocol standard.

20. The communication device of claim 12, comprising a smartphone.

21. The communication device of claim 12, wherein the selected reserved timeslots comprise about one-third of timeslots of the wireless communication link.

22. The communication device of claim 12, wherein the one or more processors are further configured to reserve further selected timeslots of the wireless communication link for a further synchronous link.

* * * * *